US009332528B2

(12) United States Patent
Kim et al.

(10) Patent No.: US 9,332,528 B2
(45) Date of Patent: May 3, 2016

(54) METHOD AND DEVICE FOR FEEDING BACK PRECODING MATRIX INDICATOR USING INTERPOLATION

(75) Inventors: Hyungtae Kim, Anyang-si (KR); Hanbyul Seo, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 13/882,526

(22) PCT Filed: Nov. 2, 2011

(86) PCT No.: PCT/KR2011/008296
§ 371 (c)(1),
(2), (4) Date: Apr. 30, 2013

(87) PCT Pub. No.: WO2012/060631
PCT Pub. Date: May 10, 2012

(65) Prior Publication Data
US 2013/0242921 A1  Sep. 19, 2013

Related U.S. Application Data

(60) Provisional application No. 61/409,511, filed on Nov. 2, 2010, provisional application No. 61/420,256, filed on Dec. 6, 2010, provisional application No. 61/427,119, filed on Dec. 24, 2010, provisional application No. 61/427,479, filed on Dec. 28, 2010.

(51) Int. Cl.
*H04W 72/02* (2009.01)
*H04B 7/02* (2006.01)
(Continued)

(52) U.S. Cl.
CPC ............... *H04W 72/02* (2013.01); *H04B 7/024* (2013.01); *H04B 7/0639* (2013.01); *H04L 1/0019* (2013.01); *H04L 1/0077* (2013.01); *H04L 1/06* (2013.01); *H04L 5/001* (2013.01);
(Continued)

(58) Field of Classification Search
USPC ......... 370/241, 252, 328–329, 335, 342–344, 370/431–432, 441
See application file for complete search history.

(56) References Cited

U.S. PATENT DOCUMENTS

| | | | |
|---|---|---|---|
| 2009/0154577 A1* | 6/2009 | Lindoff et al. | 375/260 |
| 2011/0131461 A1* | 6/2011 | Schulz et al. | 714/749 |
| 2012/0113830 A1* | 5/2012 | Zhu et al. | 370/252 |

FOREIGN PATENT DOCUMENTS

| | | |
|---|---|---|
| EP | 2151941 A | 2/2010 |
| EP | 2157707 A1 | 2/2010 |

OTHER PUBLICATIONS

R1-092111, "Feedback Information for Downlink Coordinated Scheduling/Beamforming", 3GPP TSG RAN WG! Meeting #57, May 8, 2009, See Section 2.

*Primary Examiner* — Michael Thier
*Assistant Examiner* — Eric Myers
(74) *Attorney, Agent, or Firm* — Dentons US LLP

(57) ABSTRACT

The present invention relates to a method and a device for feeding back a channel through precoding matrix indicator (PMI) interpolation. As one embodiment of the present invention, a method for feeding back a precoding matrix indicator (PMI) in a CoMP environment comprises the steps of: allowing a terminal to perform PMI interpolation by using PMIs that are included in the PMI window; allowing the terminal to select an optimum PMI by comparing the interpolated PMIs with a channel state of a current channel; and allowing the terminal to feed back the optimum PMI to a base station.

8 Claims, 10 Drawing Sheets

(51) Int. Cl.
*H04B 7/06* (2006.01)
*H04L 1/06* (2006.01)
*H04L 5/00* (2006.01)
*H04L 25/03* (2006.01)
*H04L 1/00* (2006.01)
*H04B 7/04* (2006.01)
*H04W 74/00* (2009.01)

(52) U.S. Cl.
CPC ............ *H04L 5/0035* (2013.01); *H04L 5/0053* (2013.01); *H04L 25/03343* (2013.01); *H04B 7/0413* (2013.01); *H04B 7/0456* (2013.01); *H04B 7/0617* (2013.01); *H04L 1/0026* (2013.01); *H04L 5/0023* (2013.01); *H04L 25/03949* (2013.01); *H04L 2001/0092* (2013.01); *H04L 2025/03426* (2013.01); *H04L 2025/03808* (2013.01); *H04W 74/002* (2013.01)

FIG. 5
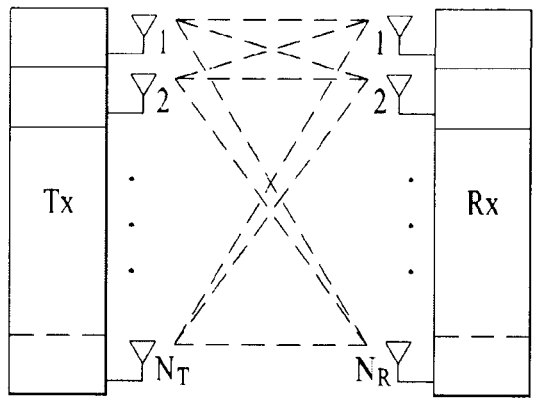
(a)
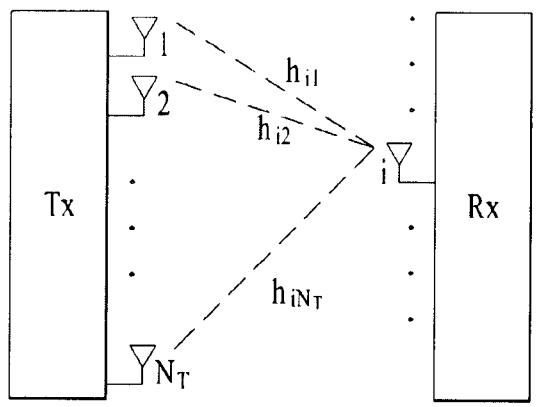
(b)

METHOD AND DEVICE FOR FEEDING BACK PRECODING MATRIX INDICATOR USING INTERPOLATION

This Application is a 35 U.S.C. §371 National Stage Entry of International Application No. PCT/KR2011/008296 filed Nov. 2, 2011 and claims the benefit of U.S. Provisional Application Nos. 61/409,511 filed Nov. 2, 2010; 61/420,256 filed Dec. 6, 2010; 61/427,119 filed Dec. 24, 2010; 61/427,479 filed Dec. 28, 2010, all of which are incorporated by reference in their entirety herein.

TECHNICAL FIELD

The present invention relates to a wireless access system, and more particularly, to a channel feedback method and apparatus employing Precoding Matrix Indicator (PMI) interpolation. The present invention also relates to a window configuration method and apparatus for PMI interpolation.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

In a Coordinated Multi-Point (CoMP) environment, a plurality of Base Stations (BSs) coordinately transmits the same data to a specific User Equipment (UE) and thus a high degree of channel accuracy is needed to avoid interference between UEs. In addition, precise channel information between the UE and the BSs is needed to avoid interference in which a neighboring cell affects a serving cell.

An object of the present invention devised to solve the problem lies in a method for efficiently transmitting and receiving a control signal (e.g. Channel State Information (CSI)).

Another object of the present invention lies in a method for providing higher channel accuracy to eliminate interference between UEs in a CoMP environment.

Still another object of the present invention lies in a method for providing higher channel accuracy to avoid interference in which a neighboring cell affects a serving cell in a CoMP environment.

A further object of the present invention lies in a method for feeding back a PMI most closely approximating a current channel through interpolation of PMIs which have already been fed back and a PMI which is to be currently fed back.

A still further object of the present invention lies in a method for configuring an interpolation window for PMI interpolation.

Another object of the present invention lies in apparatuses for supporting and performing the above methods.

It will be appreciated by persons skilled in the art that that the technical objects that can be achieved through the present invention are not limited to what has been particularly described hereinabove and other technical objects of the present invention will be more clearly understood from the following detailed description.

Technical Solution

The present invention relates to a wireless access system and provides various methods for feeding back CSI in a CoMP environment.

The object of the present invention can be achieved by providing a method for feeding back a Precoding Matrix Indicator (PMI) at a User Equipment (UE) in a Coordinated Multi-Point (CoMP) environment, including performing a PMI interpolation using PMIs included in a PMI window, selecting a desired PMI by comparing the interpolated PMI with a channel state of a current channel, and feeding back the desired PMI to a Base Station (BS).

In another aspect of the present invention, provided herein is a method for a User Equipment (UE) for feeding back a Precoding Matrix Indicator (PMI) in a Coordinated Multi-Point (CoMP) environment, including a transmission module for transmitting radio signals, a reception module for receiving radio signals, and a processor for feeding back the PMI, wherein the processor performs a PMI interpolation using PMIs included in a PMI window, selects a desired PMI by comparing the interpolated PMI with a channel state of a current channel, and feeds back the desired PMI to a Base Station (BS) through the transmission module.

In the above aspects of the present invention, the performing of the PMI interpolation may be performed by calculating an average value of the PMIs included in the PMI window. The average value of the PMIs may be calculated in consideration of phase coefficients of each of the PMIs. The average value of the PMIs may be a phase average of the PMIs.

The PMIs included in the PMI window may include a PMI in a current subframe and PMIs which have previously been fed back to the BS.

The PMI window may be determined in consideration of a transmission period of a Channel State Information-Reference Signal (CSI-RS). If the PMI window is full, all of the PMIs included in the PMI window are eliminated and a new PMI window is reset starting from a current subframe. Alternatively, if the PMI window is full, a new PMI window reuses a part of the PMIs included in the PMI window.

The UE may receive a message (RRC signaling or a PDCCH signal) including information about the PMI window from the BS.

The above aspects of the present invention are merely some parts of the exemplary embodiments of the present invention and other embodiments into which the technical features of the present invention are incorporated can be derived and understood by those skilled in the art from the detailed description of the present invention which follows.

Advantageous Effects

According to the embodiments of the present invention, the following effects are obtained.

First, a control signal (e.g. CSI) can be efficiently transmitted and received.

Second, feedback methods according to the embodiments of the present invention can provide higher channel accuracy by eliminating interference between UEs in a CoMP environment.

Third, higher channel accuracy can be provided by avoiding interference between a neighboring cell and a serving cell.

Fourth, channel accuracy can be raised by feeding back a PMI most closely approximating a current channel through interpolation of PMIs which have already been fed back and a PMI which is to be currently fed back.

Fifth, PMI interpolation can be efficiently performed by configuring an interpolation window for PMI interpolation according to a channel state.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings are provided to explain the embodiments of the present invention in detail and only parts clearly illustrating technical features of the present invention are presented in the drawings. Namely, steps and parts that are unnecessary to describe the embodiments of the present invention are not shown in the drawings, within the range that can be understood by those of ordinary skill in the art.

FIG. 5 illustrates the configuration of a radio communication system having multiple antennas;

BEST MODE

Figure 1:
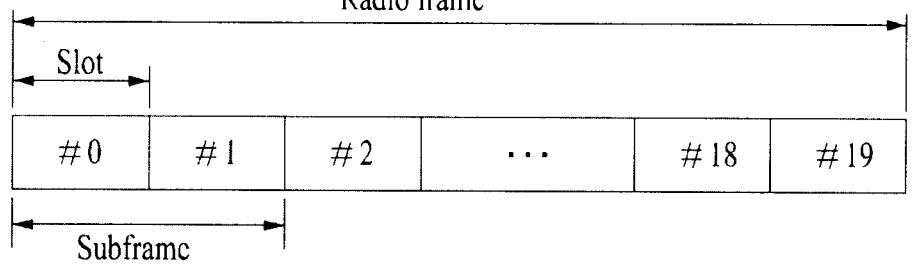
FIG. 1 is a diagram illustrating a radio frame structure which can be used in embodiments of the present invention.

Hereinafter, various CSI feedback methods in a CoMP environment will be disclosed. In addition, feedback methods through PMI interpolation, window configuration methods for PMI interpolation, and apparatuses for supporting the methods will be disclosed.

The embodiments of the present invention described below are combinations of elements and features of the present invention in a predetermined form. The elements or features are considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions or features of another embodiment.

In the description with reference to the attached drawings, procedures or steps will be omitted when they may obscure the subject matter of the present invention. In addition, procedures or steps easily understood by those skilled in the art will not be described.

In the embodiments of the present invention, a description is given of data transmission and reception between a Base Station (BS) and a terminal. Here, the BS refers to a terminal node of a network, which directly communicates with the terminal. In some cases, a specific operation described as being performed by the BS may be performed by an upper node of the BS.

Namely, it is apparent that, in a network comprised of a plurality of network nodes including a BS, various operations performed for communication with a terminal may be performed by the BS, or network nodes other than the BS. The term 'BS' may be replaced with terms such as fixed station, Node B, eNode B (eNB), Advanced Base Station (ABS), access point, etc.

The term 'terminal' may be replaced with terms such as User Equipment (UE), Mobile Station (MS), Subscriber Station (SS), Mobile Subscriber Station (MSS), mobile terminal, Advanced Mobile Station (AMS), etc.

A transmitter is a fixed and/or mobile node that provides a data service or a voice service and a receiver is a fixed and/or mobile node that receives a data service or a voice service. Therefore, in UL, an MS may serve as a transmitter and a BS may serve as a receiver. Similarly, in DL, the MS may serve as a receiver and the BS may serve as a transmitter.

The embodiments of the present invention can be supported by standard documents disclosed in at least one of wireless access systems including an Institute of Electrical and Electronic Engineers (IEEE) 802.xx system, a 3rd Generation Partnership Project (3GPP) system, a 3GPP LTE system, and a 3GPP2 system. Especially, the embodiments of the present invention can be supported by 3GPP TS 36.211, 3GPP TS 36.212, 3GPP TS 36.213, and 3GPP TS 36.321 documents. That is, obvious steps or portions that are not described in the embodiments of the present invention can be explained with reference to the above documents. In additional, for description of all terms used herein, reference can be made to the above standard documents.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

In addition, specific terms used in the embodiments of the present invention are provided to aid in understanding of the present invention and these terms may be changed without departing from the spirit of the present invention.

The following technology can be used for a variety of radio access systems, for example, Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA) systems.

CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as IEEE 802.11 (Wi-Fi), IEEE 802.16 (WiMax), IEEE 802-20, and Evolved UTRA (E-UTRA).

UTRA is a part of the Universal Mobile Telecommunications System (UMTS). 3GPP Long Term Evolution (LTE) is a part of Evolved UMTS (E-UMTS) employing E-UTRA and uses OFDMA in DL and SC-FDMA in UL. An LTE-Advanced (LTE-A) system is an evolved version of a 3GPP LTE system. To clarify description of technical features of the present invention, although 3GPP LTE/LTE-A is mainly described, the technical sprit of the present invention may be applied to IEEE 802.16e/m systems.

1. Basic Structure of 3GPP LTE/LTE-A System

FIG. 1 is a diagram illustrating a radio frame structure which can be used in embodiments of the present invention.

A radio frame includes 10 subframes and each subframe includes two slots. A time for transmitting one subframe is defined as a Transmission Time Interval (TTI). One subframe has a length of 1 ms and one slot has a length of 0.5 ms.

One slot includes a plurality of Orthogonal Frequency Division Multiplexing (OFDM) symbols in the time domain and a plurality of Resource Blocks (RBs) in the frequency domain. The OFDM symbol represents one symbol period in a 3GPP LTE system using an Orthogonal Frequency Division Multiple Access (OFDMA) scheme in DL. That is, the OFDM symbol may be called an SC-FDMA symbol or symbol period according to a multiple access scheme. An RB is a resource allocation unit and includes a plurality of consecutive subcarriers per slot.

The radio frame structure shown in FIG. 1 is purely exemplary and various modifications may be made in the number of subframes included in a radio frame, the number of slots included in a subframe, and the number of OFDM symbols included in a slot.

Figure 2:
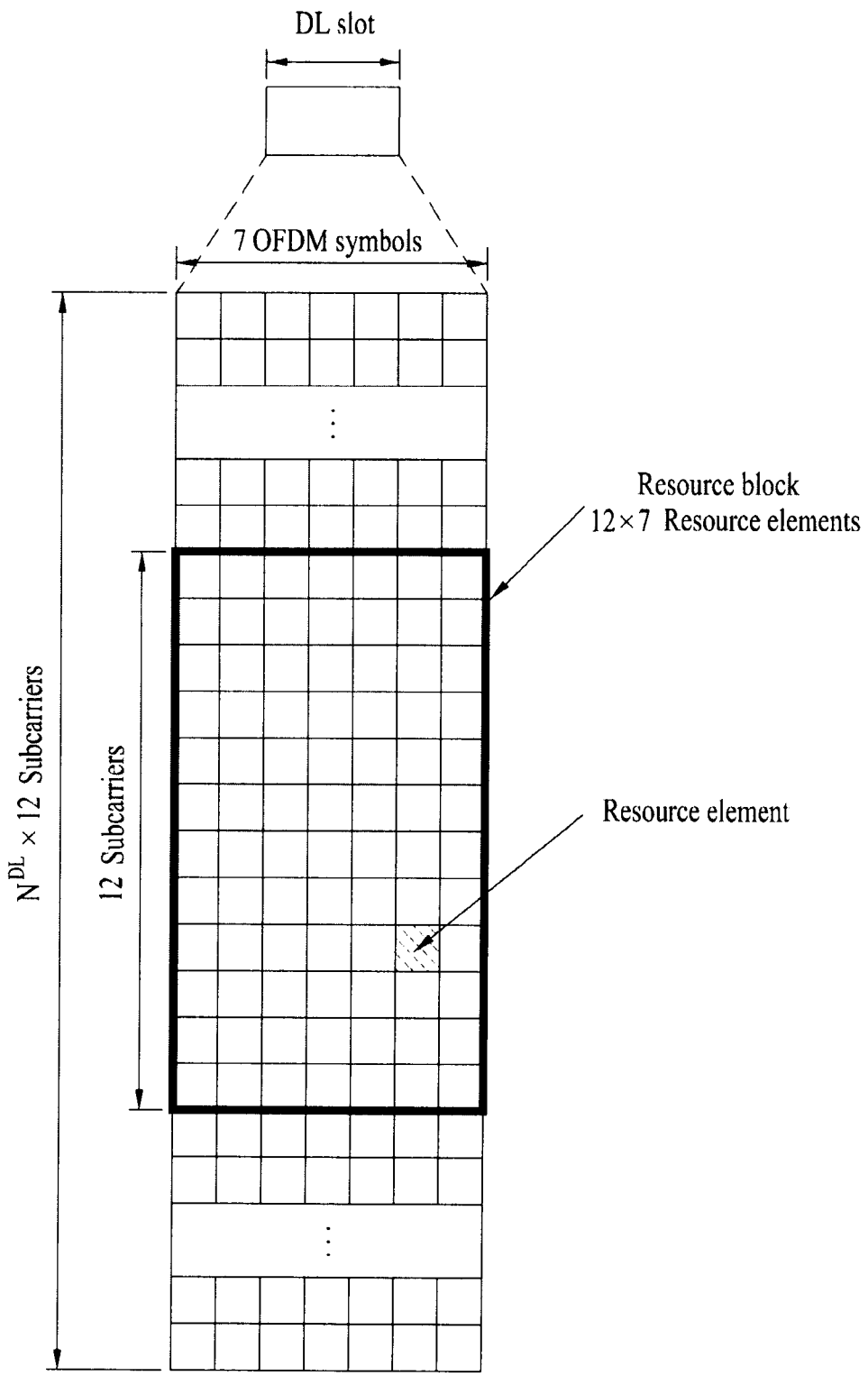
FIG. 2 is a diagram illustrating a resource grid for one DL slot which can be used in embodiments of the present invention.

FIG. 2 is a diagram illustrating a resource grid for one DL slot which can be used in embodiments of the present invention.

A DL slot includes a plurality of OFDM symbols in the time domain. In the illustrated example of FIG. 2, one DL slot includes 7 OFDM symbols and one RB includes 12 subcarriers in the frequency domain.

Each element on a resource grid is referred to as a Resource Element (RE). One RB includes 12×7 REs. The number of RBs included in a DL slot, $N^{DL}$, depends on DL transmission bandwidth configured in a cell.

Figure 3:
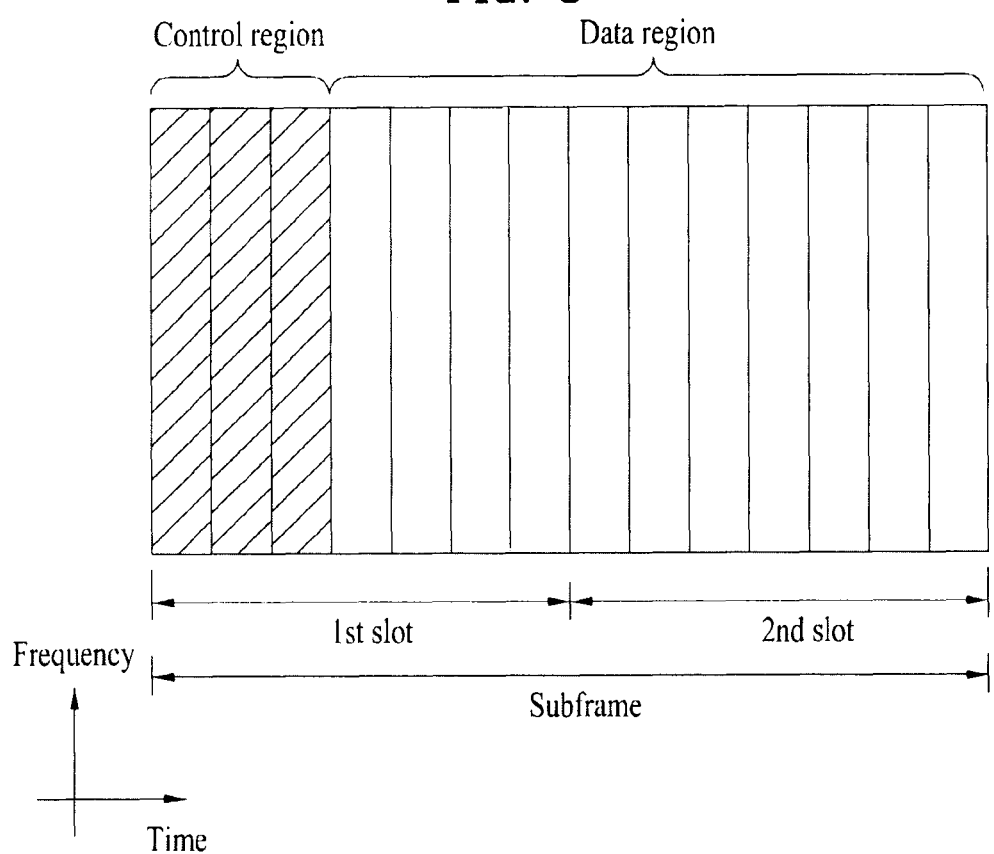
FIG. 3 is a diagram illustrating a DL subframe structure which can be used in embodiments of the present invention.

FIG. 3 is a diagram illustrating a DL subframe structure which can be used in embodiments of the present invention.

A subframe includes two slots in the time domain. A maximum of 3 OFDM symbols in the front portion of the first slot in a subframe corresponds to a control region to which control channels are allocated and the remaining OFDM symbols correspond to a data region to which a Physical Downlink Shared Channel (PDSCH) is allocated.

DL control channels used in a 3GPP LTE system include a Physical Control Format Indicator Channel (PCFICH), a Physical Downlink Control Channel (PDCCH), and a Physical Hybrid-ARQ Indicator Channel (PHICH). A PCFICH signal transmitted on the first OFDM symbol of a subframe carries information about the number of OFDM symbols (i.e. the magnitude of the control region) used for control channel signal transmission in the subframe. The PHICH carries an Acknowledgment/Negative-Acknowledgment (ACK/NACK) signal for a UL Hybrid Automatic Repeat Request (HARQ). In other words, the ACK/NACK signal for UL data transmitted by a UE is transmitted over the PHICH.

DL control information transmitted through the PDCCH is referred to as Downlink Control Information (DCI). The DCI includes resource allocation information for a UE or a UE group and includes other control information. For example, the DCI may include UL resource allocation information, DL resource allocation information, a UL transmit power control command, etc.

The PDCCH may carry a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information for a higher-layer control message such as a random access response transmitted on the PDSCH, a transmit power control command set for individual UEs in a UE group, a transmit power control command, information about activation of Voice over Internet Protocol (VoIP), and the like.

A plurality of PDCCHs may be transmitted in one control region. A UE may monitor a plurality of PDCCHs. The PDCCH is transmitted on one or more consecutive Control Channel Elements (CCEs). A CCE is a logical allocation unit used to provide the PDCCH with a coding rate based on a radio channel state. The CCE corresponds to a plurality of Resource Element Groups (REGs). A format of the PDCCH and the number of available bits of the PDCCH are determined according to the correlation between a code rate provided in the CCE and the number of CCEs. An eNB determines the PDCCH format according to DCI to be transmitted to a UE and attaches a Cyclic Redundancy Check (CRC) to control information.

The CRC is masked together with a Radio Network Temporary Identifier (RNTI) according to the usage method or owner of the PDCCH. If the PDCCH is dedicated to a specific UE, an identifier of the UE (e.g. cell-RNTI (C-RNTI)) is masked to the CRC. If the PDCCH is dedicated to a paging message, a paging identifier (e.g. paging-RNTI (P-RNTI)) is masked to the CRC. If the PDCCH is for system information (especially, a system information block), a system information identifier and a system information RNTI (S-RNTI) may be masked to the CRC. A Random Access RNTI (RA-RNTI) may be masked to the CRC in order to indicate a random access response to reception of a random access preamble of a UE.

In a CA environment, a PDCCH may be transmitted through one or more CCs and include resource allocation information for one or more CCs. For example, although the PDCCH is transmitted through one CC, the PDCCH may include resource allocation information for one or more PDSCHs and PUSCHs.

Figure 4:
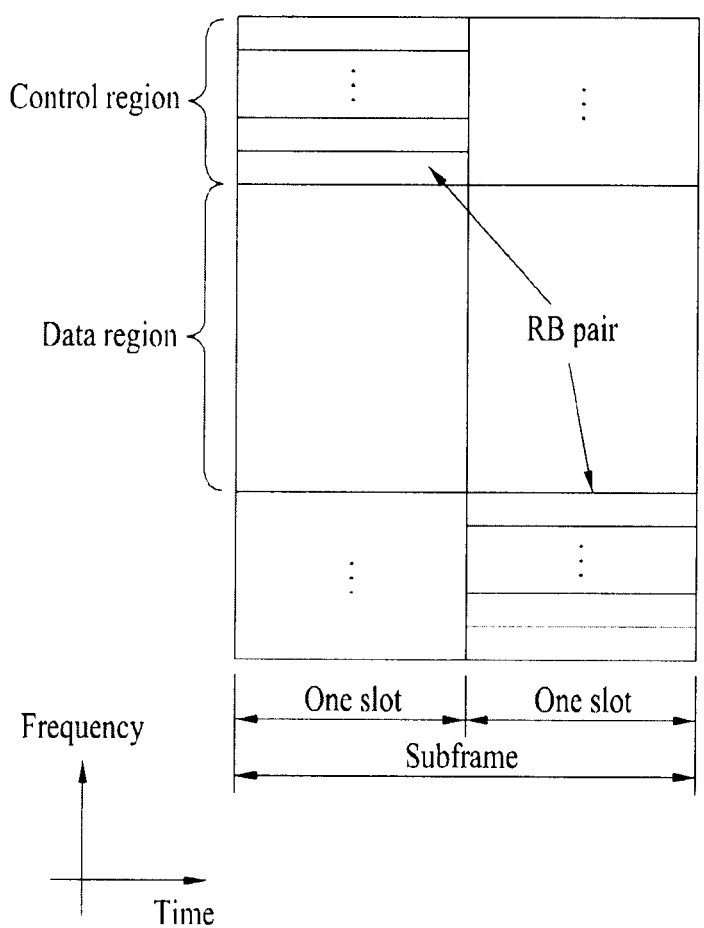
FIG. 4 is a diagram illustrating a UL subframe structure which can be used in embodiments of the present invention.

FIG. 4 is a diagram illustrating a UL subframe structure which can be used in embodiments of the present invention;

Referring to FIG. 4, a UL subframe includes plural (e.g. two) slots. Each slot may include a different number of SC-FDMA symbols according to the length of a Cyclic Prefix (CP). The UL subframe is divided into a data region and a control region in the frequency domain. The data region includes a Physical Uplink Shared Channel (PUSCH) and is used to transmit data signals including voice information. The control region includes a PUCCH and is used to transmit Uplink Control Information (DCI). The PUCCH includes an RB pair located at both ends of the data region in the frequency domain and is hopped using the slot as a boundary.

In an LTE system, a UE does not simultaneously transmit a PUCCH signal and a PUSCH signal in order to maintain a single carrier property. Nonetheless, in an LTE-A system, the PUCCH signal and the PUSCH signal may be simultaneously transmitted in the same subframe according to a transmission mode of a UE and the PUCCH signal may be piggybacked on the PUSCH signal for transmission.

A PUCCH for one UE is allocated in an RB pair in a subframe and RBs belonging to the RB pair occupy different subcarriers in two respective slots. Thus, the RB pair allocated to the PUCCH is frequency-hopped at a slot boundary.

The PUCCH may be used to transmit the following control information.

Scheduling Request (SR): SR is used for requesting UL-SCH resources and is transmitted using an On-Off Keying (OOK) scheme.

HARQ ACK/NACK: HARQ ACK/NACK is a response signal to a PDCCH indicating a DL data packet or Semi-Persistent Scheduling (SPS) release on a PDSCH. HARQ ACK/NACK indicates whether or not the PDCCH indicating the DL data packet or SPS release has been successfully received. A 1-bit ACK/NACK is transmitted as a response to a single DL codeword and a 2-bit ACK/NACK is transmitted as a response to two DL codewords. In the case of TDD, ACK/NACK responses to a plurality of DL subframes are gathered and transmitted on one PUCCH through bundling or multiplexing.

Channel Quality Indicator (CQI) or Channel State Information (CSI): CQI or CSI is feedback information for a DL channel. Multiple Input Multiple Output (MIMO)-associated feedback information includes a Rank Indicator (RI) and a Precoding Matrix Indicator (PMI). 20 bits are used per subframe. In the embodiments of the present invention, CSI may be interpreted as including all of CQI, RI, and PMI.

The amount of UCI that can be transmitted in a subframe by a UE is dependent upon the number of SC-FDMA symbols available for UCI transmission. The SC-FDMA symbols available for UCI transmission indicate the remaining SC-FDMA symbols other than SC-FDMA symbols that are used for reference signal transmission in a subframe. In the case of a subframe in which a Sounding Reference Signal (SRS) is configured, the last SC-FDMA symbol of the subframe is also excluded. The reference signal is used for coherent detection of a PUCCH. The PUCCH supports 7 formats according to transmitted information.

Table 1 shows the mapping relationship between PUCCH and UCI for use in LTE.

TABLE 1

| PUCCH Format | UCI |
| --- | --- |
| Format 1 | Scheduling request (SR) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK for extended CP |
| Format 2a | CQI and 1-bit HARQ ACK/NACK |
| Format 2b | CQI and 2-bit HARQ ACK/NACK |

2. Multicarrier Aggregation Environment

A communication environment considered in the embodiments of the present invention includes all environments supporting multicarrier aggregation. That is, a multicarrier system or a carrier aggregation system used in the present invention refers to a system configuring a target wideband by aggregating more than one carrier having a bandwidth narrower than a target bandwidth in order to support a wide band.

In the present invention, multiple carriers indicate aggregation of CCs (or CA). In this case, CA refers to not only aggregation of contiguous carriers but also aggregation of non-contiguous carriers. Multicarrier aggregation is used interchangeably with the term CA or bandwidth aggregation.

In an LTE-A system, the goal of multicarrier aggregation (i.e. CA) in which two or more CCs are aggregated is to support up to a bandwidth of 100 MHz. When more than one carrier having a bandwidth narrower than a target bandwidth is aggregated, the bandwidth of each aggregated carrier may be restricted to a bandwidth used in a legacy system in order to maintain backward compatibility with a legacy IMT system.

For example, a legacy 3GPP LTE system may support bandwidths of {1.4, 3, 5, 10, 15, 20} MHz and a 3GPP LTE-A system may support a bandwidth wider than 20 MHz, using only the above bandwidths supported in the LTE system. A multicarrier system used in the present invention may support CA by defining a new bandwidth irrespective of the bandwidths used in the legacy system.

The LTE-A system uses the concept of a cell to manage radio resources. The cell is defined as a combination of a DL resource and a UL resource and the UL resource may be selectively defined. Accordingly, the cell may be configured by the DL resource alone or by the DL resource and the UL resource. When multiple carriers (i.e. CA) are supported, the linkage between the carrier frequency (or DL CC) of the DL resource and the carrier frequency (or UL CC) of the UL resource may be indicated by system information.

A cell used in the LTE-A system includes a Primary cell (PCell) and a Secondary cell (SCell). The PCell may refer to a cell operating on a primary frequency (or primary CC) and the SCell may refer to a cell operating on a secondary frequency (or secondary CC). Notably, only one PCell and one or more SCells may be allocated to a specific UE.

The PCell is used to perform an initial connection establishment procedure or a connection re-establishment procedure. The PCell may refer to a cell indicated during a handover procedure. The SCell can be configured after Radio Resource Control (RRC) connection is established and may be used to provide additional radio resources.

The PCell and SCell may be used as a serving cell. In case of a UE in which CA is not configured or CA is not supported even in an RRC_CONNECTED state, only a single serving cell comprised of only a PCell is present. Meanwhile, in case of a UE in which CA is configured in an RRC_CONNECTED state, one or more serving cells may be present and all cells include a PCell and one or more SCells.

After an initial security activation procedure is started, an E-UTRAN may configure a network including one or more SCells in addition to an initially configured PCell during a connection establishment procedure. In a multicarrier environment, each of a PCell and an SCell may serve as a CC. Namely, CA may be understood as a combination of a PCell and one or more SCells. In the following embodiments, a Primary CC (PCC) may have the same meaning as a PCell and a Secondary CC (SCC) may have the same meaning as an SCell.

3. Multi-Input Multi-Output (MIMO) Feedback

A radio access system supporting multicarrier aggregation used in the embodiments of the present invention may also support a MIMO feedback method using two or more input/output antennas.

MIMO feedback information includes a Precoding Matrix Index (PMI), a Rank Indicator (RI), and a Channel Quality Information (CQI) index. The RI is determined from the number of assigned transmission layers and a UE may obtain an RI value from associated DCI. The PMI is defined in TS 36.211. An SINR for each PMI is calculated and the SINR is transformed into capacity. The best PMI may be selected based on the capacity. The CQI represents channel quality and the CQI index indicates channel coding rate and a modulation scheme.

FIG. 5 illustrates the configuration of a radio communication system having multiple antennas.

As shown in FIG. 5(a), if the number of transmit antennas is increased to $N_T$ and the number of receive antennas is increased to $N_R$, theoretical channel transmission capacity is increased in proportion to the number of antennas, unlike the case where a plurality of antennas is used in either a transmitter or a receiver. Accordingly, it is possible to improve transmission rate and to remarkably improve frequency efficiency. As the channel transmission capacity is increased, transmission rate may be theoretically increased by a product of a maximum transmission rate $R_0$ upon using a single antenna and a rate increase ratio $R_i$.

$$R_i = \min(N_T, N_R) \quad \text{[Equation 1]}$$

For example, in a MIMO system using four transmit antennas and four receive antennas, it is possible to theoretically acquire a transmission rate which is four times that of a single antenna system. After increase in the theoretical capacity of the MIMO system was proven in the mid-1990s, various technologies for substantially improving data transmission rate have been actively developed up to now. In addition, several technologies have already been applied to the various radio communication standards such as the third-generation mobile communication and next-generation wireless local area network (LAN).

According to research trends in MIMO up to now, research has been actively conducted in various aspects, such as research into information theory related to MIMO communication capacity calculation in various channel environments and multiple access environments, research into radio channel measurement and model derivation of the MIMO system, and research into space-time signal processing technologies for improving transmission reliability and transmission rate.

The communication method of the MIMO system will be described in more detail using mathematical modeling. In the above system, it is assumed that $N_T$ transmit antennas and $N_R$ receive antennas are present.

In transmission signals, if $N_T$ transmit antennas are present, the number of pieces of maximally transmittable information is $N_T$. The transmission information may be expressed as follows.

$$s = [s_1, s_2, \ldots, s_{N_T}]^T \quad \text{[Equation 2]}$$

The transmission information $S_1, S_2, \ldots, S_{N_T}$ may have different transmit powers. If the respective transmit powers are $P_1, P_2, \ldots, P_{N_T}$, the transmission information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ may be expressed using a diagonal matrix $P$ of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Consider that the $N_T$ actually transmitted signals $x_1, x_2, \ldots, x_{N_T}$ are configured by applying a weight matrix $W$ to the information vector $\hat{s}$ with the adjusted transmit powers. The weight matrix $W$ serves to appropriately distribute the transmission information to each antenna according to a transport channel state, etc. $x_1, x_2, \ldots, x_{N_T}$ may be expressed by using the vector $X$ as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$= W\hat{s} = WPs$$

where, $W_{ij}$ denotes a weight between an i-th transmit antenna and j-th information. $W$ is also called a precoding matrix.

If the $N_R$ receive antennas are present, respective reception signals $y_1, y_2, \ldots, y_{N_R}$ of the antennas are expressed as follows.

$$y = [y_1, y_2, \ldots, y_{N_R}]^T \quad \text{[Equation 6]}$$

If channels are modeled in the MIMO radio communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) illustrates channels from the $N_T$ transmit antennas to the receive antenna i. The channels may be combined and expressed in the form of a vector and a matrix. In FIG. 5(b), the channels from the $N_T$ transmit antennas to the receive antenna i may be expressed as follows.

$$h_i^T = [h_{i1}, h_{i2}, \ldots, h_{iN_T}] \quad \text{[Equation 7]}$$

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Additive White Gaussian Noise (AWGN) is added to the actual channels after a channel matrix $H$. The AWGN $n_1, n_2, \ldots, n_{N_R}$ added to the $N_T$ transmit antennas may be expressed as follows.

$$n = [n_1, n_2, \ldots, n_{N_R}]^T \quad \text{[Equation 9]}$$

Through the above-described mathematical modeling, the reception signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$ [Equation 10]

$$= Hx + n$$

The numbers of rows and columns of the channel matrix H indicating the channel state are determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined by the smaller of the numbers of rows and columns which are independent of each other. Accordingly, the rank of the matrix is not greater than the number of rows or columns. The rank rank (H) of the channel matrix H is restricted as follows.

$$\text{rank}(H) \leq \min(N_T, N_R)$$ [Equation 11]

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

In a description of the present document, a 'rank' for MIMO transmission refers to the number of paths which can independently transmit signals at a specific time point and a specific frequency resource, and 'the number of layers' refers to the number of signal streams transmitted through each path. Generally, since a transmitter transmits layers corresponding in number to ranks used for signal transmission, rank has the same meaning as the number of layers unless particularly mentioned.

4. General CoMP and Feedback Method in CoMP Environment (1) CoMP Transmission and Reception To satisfy requirements for the LTE-A system, a CoMP transmission scheme has been proposed. CoMP is also referred to as co-MIMO, collaborated MIMO, or network MIMO. CoMP is devised to increase the performance of UEs located at a cell edge and average sector throughput.

Generally, Inter-Cell Interference (ICI) degrades the performance of a UE at a cell edge and average sector throughput in a multi-cell environment with a frequency reuse factor of 1. To offer an appropriate throughput performance to a cell-edge UE in an environment constrained by interference while reducing ICI, a simple technique (e.g. UE-specific power control-based Fractional Frequency Reuse (FFR)) may be applied to the LTE-A system. However, it is more effective to reduce ICI or reuse CI as a desired signal, rather than to decrease the utilization of frequency resources per cell.

Downlink CoMP schemes may be classified into Joint Processing (JP), and Coordinated Scheduling/Beamforming (CS/CB). According to the JP scheme, data can be transmitted through a CoMP cooperation set.

In case of joint transmission, PDSCH signals are simultaneously transmitted from a plurality of points (a part or the whole of a CoMP cooperation set). That is, a plurality of transmission points simultaneously transmits data to a single UE to improve reception signal quality and/or to reduce activation interference for other UEs. In the case of dynamic cell selection, a PDSCH signal is transmitted from one point (of a CoMP cooperation set) at one time.

In the CS/CB scheme, while only a serving cell transmits data to the UE, user scheduling/beamforming selection may be determined through coordination among cells of the CoMP cooperation set.

Uplink CoMP reception refers to reception of transmission signals through cooperation among a plurality of geographically separate points. Uplink CoMP schemes may be divided into Joint Reception (JR), and Coordinated Scheduling/Beamforming (CS/CB).

In JR, a plurality of reception points receives a PUSCH signal. In CS/CB, while only one point receives a PUSCH signal, user scheduling/beamforming is determined through coordination among cells of a CoMP cooperation set.

(2) Downlink CSI Feedback

In 3GPP LTE standard, open-loop MIMO performing transmission without channel information and closed-loop MIMO performing transmission based on channel information are defined. To obtain multiplexing gain of MIMO antennas in closed-loop MIMO, each of a transmitter and a receiver performs beamforming based on channel information (e.g. CSI). An eNB may command a UE to feed back downlink CSI by allocating a PUCCH or a PUSCH to a UE to obtain downlink CSI.

CSI may be largely classified into three types of information, i.e. a Rank Indicator (RI), a Precoding Matrix Indicator (PMI), and Channel Quality Information (CQI).

RI is information about a channel rank indicating the number of streams received by the UE in the same time-frequency resources. Because RI depends dominantly on long-term fading of a channel, it may be fed back from the UE to the eNB at a longer period than PMI and CQI. PMI indicates a precoding index of the eNB preferred by the UE based on a metric of Signal to Interference plus Noise Ratio (SINR), reflecting the spatial characteristics of a channel. CQI is a value indicating the strength of a channel and represents reception SINR which can be generally obtained when the eNB uses PMI.

Methods for acquiring additional multi-user diversity using Multi-User MIMO (MU-MIMO) are under consideration in an evolved communication system such as an LTE-A system. To this end, higher accuracy is needed in terms of channel feedback.

The reason is that, in MU-MIMO, since an interference channel exists between UEs multiplexed in an antenna domain, accuracy of a feedback channel considerably influences interference of not only a UE which has transmitted feedback information but also other multiplexed UEs.

For CoMP, higher channel accuracy is needed. In CoMP JT, because a plurality of eNBs coordinates transmission of the same data to a specific UE, CoMP JT may be theoretically considered as a MIMO system in which antennas are geographically distributed. Namely, when MU-MIMO is performed in CoMP JT, a high degree of channel accuracy is needed to avoid interference between co-scheduled UEs as in single-cell MU-MIMO. Also in CoMP CB, accurate channel information is needed to avoid interference in which a neighboring cell affects a serving cell. Accordingly, various feedback methods for raising accuracy of a feedback channel will be proposed hereinbelow.

(3) Enhanced PMI Feedback for MU-MIMO or CoMP
i) BCPMI Feedback

As described above, transmission schemes such as MU-MIMO and CoMP have been proposed to achieve high transmission rate in the LTE-A system. For such an enhanced transmission scheme, a UE needs to feed back highly complicated and various CSI to an eNB.

For example, in MU-MIMO, when a UE (i.e. UE-A) selects a PMI, a CSI feedback scheme for feeding back not only a desired PMI of the UE-A but also a PMI of a UE to be scheduled along with the UE-A (hereinafter, referred to as a Best Companion PMI (BCPMI)) is considered. That is, the co-scheduled UE may calculate a BCPMI which creates less interference with respect to other UE-As when using PMIs as a precoder in a precoding matrix codebook and additionally feed back the BCPMI to the eNB together with CSI thereof. The eNB may perform MU-MIMO scheduling with respect to the UE-A and another UE that prefers Best Companion Precoding Matrix (BCPM) precoding indicated by the BCPMI, based on the BCPMI information.

The BCPMI feedback scheme may be largely classified into an explicit feedback scheme and an implicit feedback scheme according to whether feedback payload is present.

The explicit feedback scheme includes the feedback payload. In the explicit feedback scheme, the UE determines a BCPMI in a precoding matrix codebook and feeds back the determined BCPMI to the eNB through a control channel. As an example of the explicit feedback scheme, the UE may select an interference signal precoding matrix which maximizes estimated SINR from the codebook and feed back the precoding matrix to the eNB as a BCPMI value.

The explicit feedback scheme has an advantage that the UE is able to selectively transmit a BCPMI which is more effective in eliminating interference. The UE considers each codeword in the codebook as an interference beam and compares metrics of SINR etc., thereby determining the most effective value for interference elimination as the BCPMI. Nonetheless, the explicit feedback scheme has a disadvantage of requiring larger payload size because candidates of the BCPMI increase as the size of a codeword increases.

The implicit feedback scheme does not include the feedback payload. In the implicit feedback scheme, if a desired PMI is determined, a BCPMI corresponding to the desired PMI is statically determined as opposed to the scheme in which the UE selects a codeword with less interference in a codebook as the BCPMI.

In the implicit feedback scheme, the BCPM is preferably comprised of vectors orthogonal to the determined desired PMI. This is because an interference signal selected by excluding the direction of the desired PMI is effective in mitigating interference since the desired PMI is configured in the direction of maximizing a channel gain of a channel H in order to maximize a reception SINR. If the channel H between the UE and the eNB is decomposed into a plurality of independent channels through Singular Value Decomposition (SVD), the advantage of the BCPMI determination scheme becomes more clear. For example, a 4×4 channel H may be decomposed through SVD as indicated by Equation 12.

$$H = ULV^H = [u_1\ u_2\ u_3\ u_4]\begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix}\begin{bmatrix} v_1^H \\ v_2^H \\ v_3^H \\ v_4^H \end{bmatrix} \quad \text{[Equation 12]}$$

In Equation 12, U and V are unitary matrices, and ui, vi, and $\lambda_i$ respectively denote a 4×1 left singular vector of the channel H, a 4×1 right singular vector of the channel H, and a singular value of the channel H arranged in descending order of $\lambda_t > \lambda_{t*1}$. If a transmitter uses a beamforming matrix V and a receiver uses a beamforming matrix U'', all channel gains that can be theoretically obtained are acquired without any loss.

The UE can obtain optimal performance in terms of SNR by acquiring a channel gain $|\lambda_1|^2$ upon using a transmission beamforming vector $v_1$ and a reception beamforming vector $u_1$ in rank 1. For example, in the case of rank 1, it is desirable that the UE select a Precoding Matrix (PM) most similar to $v_1$.

Ideally, if a desired PM is completely equal to $v_1$, the UE can completely eliminate an interference signal from a desired signal without loss by setting a reception beam to $u_1$ and setting a transmission beam of the interference signal to a direction orthogonal to the PM. In reality, if there is a slight difference between the desired PM and $v_1$ due to quantization error, a transmission beam of an interference signal configured in a direction orthogonal to a PM is no longer equal to a beam orthogonal to $v_1$. Hence, although the UE cannot completely eliminate the interference signal from the desired signal without any loss, such setting may be helpful to control the interference signal.

As an example of the implicit feedback scheme, an LTE codebook shown in the following Table 2 may be used. In this case, a BCPMI may be statically determined as shown in Table 3 by a vector index orthogonal to a PMI.

TABLE 2

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1234\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 2-continued

| Codebook index | $u_n$ | Number of layers $v$ | | | |
|---|---|---|---|---|---|
| | | 1 | 2 | 3 | 4 |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 2 shows the codebook in the case of 4-antenna port transmission. A precoding matrix W may be selected from Table 2 or a subset of Table 2. A quantity $W_n^{(s)}$ denotes a matrix defined by columns given by a set $\{s\}$ expressed as $Wn = 1 - 2u_n u_n^{11}/u_n^{11} u_n$, where 1 is a 4×4 identity matrix and each vector $u_n$ is given by Table 2.

TABLE 3

| | SUMIMO rank-1 PMI | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| BCPMI | 1, 2, 3 | 2, 3, 0 | 3, 0, 1 | 0, 1, 2 | 5, 6, 7 | 6, 7, 4 | 7, 4, 5 | 4, 5, 6 | 9, 10, 11 | 10, 11, 8 | 11, 8, 9 | 8, 9, 10 | 13, 14, 15 | 14, 15, 12 | 15, 12, 13 | 12, 13, 14 |

If the number of transmission antennas is 4 and a reception rank of a UE that has fed back a PMI is 1, three vectors orthogonal to a desired PMI may be expressed as three BCPMIs as shown in Table 3. Referring to Table 3 for example, if PMI=3, a BCPMI is determined as (0, 1, 2). In this case, the PMI and the BCPMI denote indexes of 4×1 vector codewords in the codebook. The eNB may regard the BCPMI set (e.g. BCPMI=0, 1, 2) as a precoding index effective in eliminating interference and use a part or all of the BCPMI set as a precoder of a co-scheduled UE.

The advantage of the implicit feedback scheme is that additional feedback overhead does not exist because the desired PMI and the BCPMI set are mapped in one to one correspondence. However, due to a quantization error of the desired PM (i.e. a PM corresponding to a PMI), a BCPM depending on the desired PM may have an error in a desired beam direction for interference elimination.

In Table 3, if there is no quantization error, all three BCPMs indicate an interference beam for completely eliminating interference (i.e. an ideal interference beam). However, in the absence of an error, there may be a difference between each BCPM and an ideal interference beam. Moreover, a difference between each BCPM and an ideal interference beam may be the same on average but may be different at a specific moment.

For example, if the desired PMI is 3, the BCPMIs may be effective in eliminating an interference signal in order of 0, 1, and 2. However, the eNB that does not know a relative error of the BCPMIs of 0, 1, and 2 may have a possibility of determining the BCPMI 2, which has the largest error size with the ideal interference beam, as an interference signal beam and performing communication in the strongest interference state between co-scheduled UEs.

ii) WCPMI Feedback

Another feedback element considered as additional channel feedback for MU-MIMO and CoMP is a Worst Companion PMI (WCPMI).

The WCPMI is the opposite concept of the BCPMI. The WCPMI indicates an index for a BCPM affecting greatest interference on a UE when a PMI is used as a precoding matrix of an interference signal. When MU-MIMO is performed, an eNB receiving the WCPMI may determine a precoding matrix of a co-scheduled UE as a beam having a low correlation with the WCPMI, thereby mitigating interference.

In CoMP CB, an eNB of a neighboring cell receiving the WCPMI may determine a precoding matrix of a UE as a beam having a low correlation with the WCPMI to mitigate interference. In CoMP JP, an eNB of a neighboring cell receiving the WCPMI may determine a precoding matrix of a CoMP UE as a beam having a high correlation with the WCPMI.

iii) Effective Channel Feedback

As an additional alternative feedback scheme, effective channel feedback may be considered. An effective channel is obtained by applying a reception beamforming matrix to a measured channel. If the reception beamforming matrix of a UE is U and the measured channel is H, the effective channel is expressed as U*H.

To acquire the effective channel, the UE determines a reception beam capable of obtaining high reception signal power from a channel with a serving cell. Theoretically, the reception beam is determined as a conjugate transpose of a left dominant singular vector of a channel from a serving cell. When CoMP is performed, a CoMP UE (or a co-scheduled UE) transmits data by quantizing U*H on a serving cell and U*Hc on a neighboring cell. Upon receiving the quantized data, the serving cell configures a beam having a high correlation with U*H. When CB is performed, the neighboring cell receiving the beam determines a precoding matrix of the UE as a beam having a low correlation with U*Hc, thereby mitigating interference. When JT is performed, the neighboring cell may determine a precoding matrix of a CoMP UE as a beam having a high correlation with U*Hc, 5. PMI Feedback Method Through Interpolation (1) PMI Interpolation Method 1

Hereinafter, PMI interpolation methods will be described in detail. That is, the UE performs interpolation of PMIs within a window size determined between the UE and an eNB that have already been fed back and a PMI that is to be fed back currently, compares the interpolated result with a current channel, and feeds back a PMI most closely approximating the current channel in order to raise feedback channel accuracy.

Figure 6:
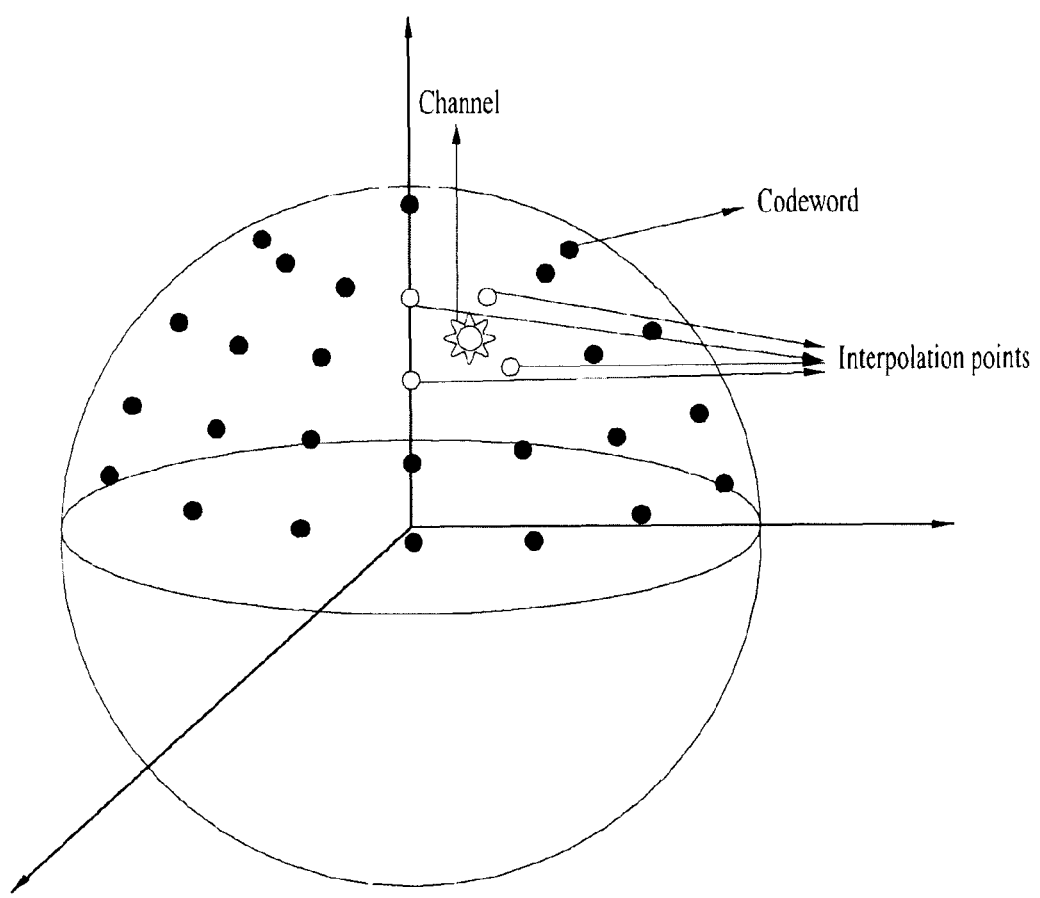
FIG. 6 is a view illustrating exemplary interpolation used in embodiments of the present invention.

FIG. 6 is a view illustrating exemplary interpolation used in embodiments of the present invention.

In the illustrated case of FIG. 6, 4 PMs (Precoding Matrixes) are interpolated with respect to a current channel when a window size is 4. For convenience of description, the current channel and vectors represented by PMIs (i.e. codewords) are geometrically expressed in three-dimensional space in FIG. 6. The eNB and the UE may share a PMI interpolation method and a window size for the PMI interpolation. Accordingly, upon receiving interpolated PMIs from the UE, the eNB may perform interpolation in the same manner as in the UE to estimate a channel.

Figure 7:
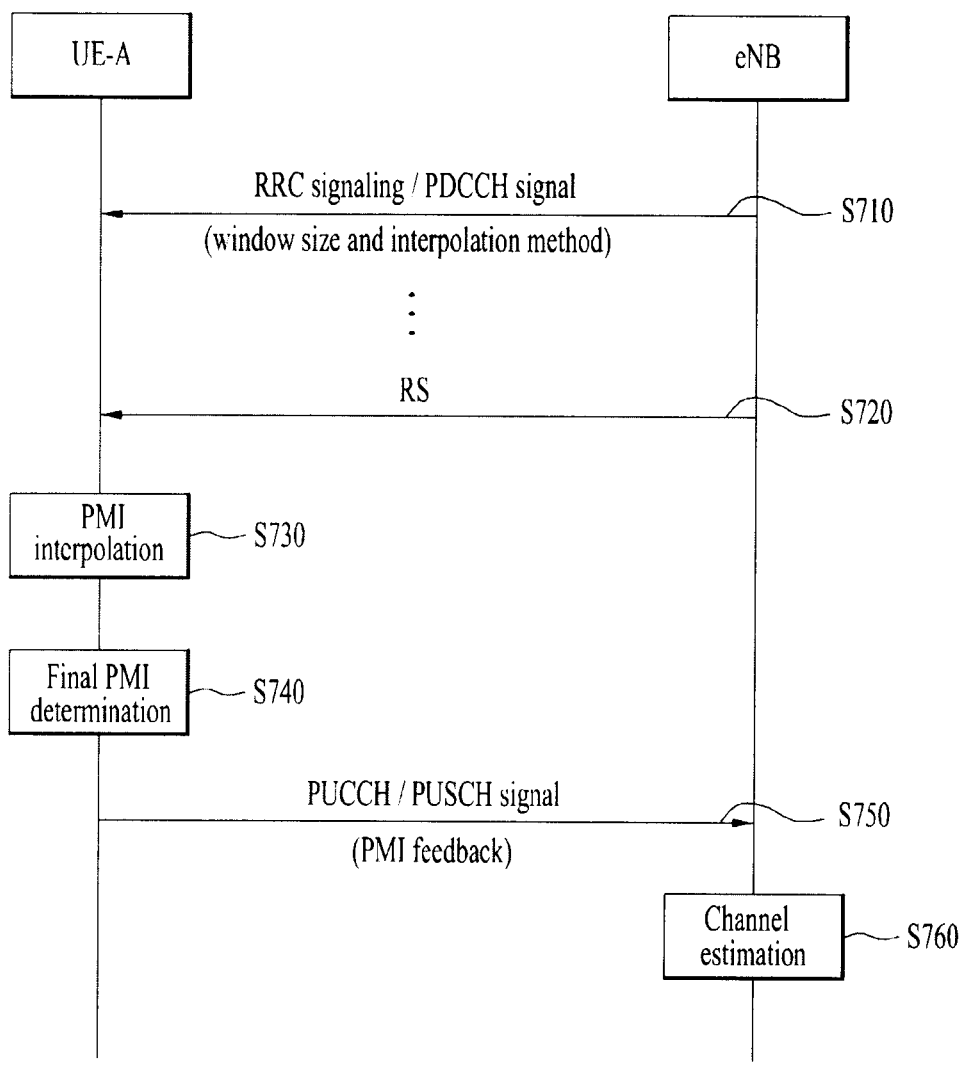
FIG. 7 is a view illustrating one method for determining a PMI through interpolation and feeding back the determined PMI according to an embodiment of the present invention.

FIG. 7 is a view illustrating one method for determining a PMI through interpolation and feeding back the determined PMI according to an embodiment of the present invention.

In accordance with embodiments of the present invention, the window size designates the number of PMIs that have been fed back, interpolated with a PMI that is currently fed back. Namely, if the window size determined between the eNB and the UE is N, (N−1) previous PMIs and a current PMI are used for interpolation. Various parameters may be considered to determine the window size.

For example, UE mobility, Doppler frequency, and/or channel variation rate may be considered to determine the window size. When a channel is rapidly changed, it may be difficult to raise accuracy of a feedback channel even though the size of an interpolation window is increased because correlation between previous PMIs and a current PMI is low. However, when a channel is static, it is desirable to increase the window size.

Referring to FIG. 7, an eNB may semi-statically determine the window size to transmit the determined window size to a UE (i.e. UE-A) through higher-layer (e.g. RRC) signaling or dynamically determine the window size to inform the UE of the determined window size through a control channel such as a PDCCH. In this case, the eNB may transmit an interpolation method to be performed by the UE to the UE, as well as the window size (S710).

In step S710, the UE receives the window size and interpolation method from the eNB. However, the UE may determine the window size for PMI interpolation and/or the interpolation method according to a channel state and transmit the determined window size and interpolation method to the eNB as opposed to step S710.

The eNB transmits RSs for downlink channel measurement to the UE-A (S720).

The UE may acquire the window size for PMI interpolation through RRC signaling or the PDCCH signal received in step S710. The UE may measure the state of a current channel based on the RSs received in step S720 and determine PMIs in each frame. Accordingly, the UE may perform interpolation for the PM's included in a window according to the window size (S730).

PMI interpolation may be implemented in various manners. The following Equation 13 indicates an example of PMI interpolation $$f(PMI_M(i), PMI_{M-1}, \ldots, PMI_{M-(N-1)}) = \quad \text{[Equation 13]}$$

$$nor\left(\frac{\alpha_1 PM_M(i) + \alpha_2 PM_{M-1} + \ldots + \alpha_N PM_{M-(S-1)}}{\sum_{j=1}^{N} \alpha_j}\right)$$

In Equation 13, a function ( ) denotes an interpolation function when the window size is N. A function nor( ) is a function of normalizing a norm of a matrix. $PMI_M(i)$ denotes an i-th PMI in a current m-th subframe and $PMI_{M-i}, \ldots, PMI_{M-(N-1)}$ denote an immediately previous feedback PMI and an (N−1)-th previous feedback PMI. $PM_M(i)$ and $PM_{M-n}$ denote a precoding matrix corresponding to an i-th PMI to be fed back currently and a precoding matrix corresponding to an n-th previous feedback PMI, respectively. $\alpha_n$ denotes a weighting factor multiplied by each PM. To simplify normalization, $\alpha_n$ may be fixed to 1.

For example, if $\alpha_n$ is fixed to 1, the window size is 3, and $PMI_M=1$, $PMI_{M-1}=1$, $PMI_{M-2}=2$, then a channel expressed as an interpolation result is nor((v1+v1+v2)/3). Here, vi denotes a precoding matrix corresponding to a PMI i.

As another example, if $\alpha_n$ is fixed to 1, a window size is 3, and $PMI_M=1$, $PMI_{M-1}=1$, $PMI_{M-2}=1$, then a channel expressed as an interpolation result becomes nor((v1+v1+v1)/3).

Referring back to FIG. 7, the UE compares a PMI interpolation result with a current channel and may determine a final desired PMI to be fed back to the eNB (S740).

To determine the desired PMI, the following Equation 14 may be used in step S740.

$$j = \underset{s \in PMIindexSet}{\mathrm{argmin}} \quad \text{[Equation 14]}$$

$$dist(H, f(PMI_M(i), PMI_{M-1}, \ldots, PMI_{M-(N-1)}))$$

In Equation 14, a function dist( ) denotes a value indicating the correlation between two factors. For example, Euclidean distance may be used to indicate the correlation between two factors. The first factor H in Equation 14 denotes a channel between the UE and the eNB. The second factor may be the interpolation function f(0) of Equation 13. In Equation 14, the first factor H may be directly used or a dominant singular vector of the first factor H may be used through operation of SVD. In Equation 14, j denotes a final PMI of an operation result.

The UE may feed back the determined final PMI(j) to the eNB through a PUCCH signal or a PUSCH signal (S750).

In step S750, if the UE feeds back the final PMI to the eNB, the UE may inform the eNB of a PMI interpolation method performed in step S730. If the eNB informs the UE of the interpolation method in step S710, it is unnecessary for the UE to inform the eNB of the interpolation method. However, if the UE uses an interpolation method different from the interpolation method about which the eNB informs the UE or if the eNB does not inform the UE of the interpolation method in step S710, the UE may inform the eNB of the interpolation method performed thereby during PMI feedback.

Upon receiving the PUCCH signal or PUSCH signal including the final PMI value, the eNB may confirm the final PMI value transmitted by the UE. Since the eNB is aware of the window size and interpolation method performed by the UE, the eNB may perform interpolation using the same window size and method performed by the UE-A after receiving the final PMI, thereby estimating a channel (S760).

In step S730 of FIG. 7, the UE may use another PMI interpolation method. For example, the UE-A may separate a current accurate channel in the form of a linear combination of codewords and determine corresponding codewords within the window size in proportion to a weight (e.g. a phase factor) of each codeword. Then the UE may report the determined codeword to the eNB.

For example, if the window size is N, $\alpha_n=1$, and H=c1v1+c2v2+c3v10, the UE may feed back codewords (i.e. PMIs) v1, v2, and v10 to the eNB in the ratio of c1/(c1+c2+c3):c2/(c1+c2+c3): c3/(c1+c2+c3). Namely, the UE may report the PMIs that are different in ratios of the number of transmission times to the eNB.

While the PMI interpolation and feedback methods described with reference to FIG. 7 have focused on downlink channel estimation of the eNB and the UE, the methods may be used as a channel feedback scheme through codewords between two or more UEs. In the embodiments of the present invention, the window for PMI interpolation may be initialized. That is, if the window is initialized, the UE may disregard all previous PMIs and may consider a current feedback PMI as an initial PMI.

(2) PMI Interpolation Method 2

Figure 8:
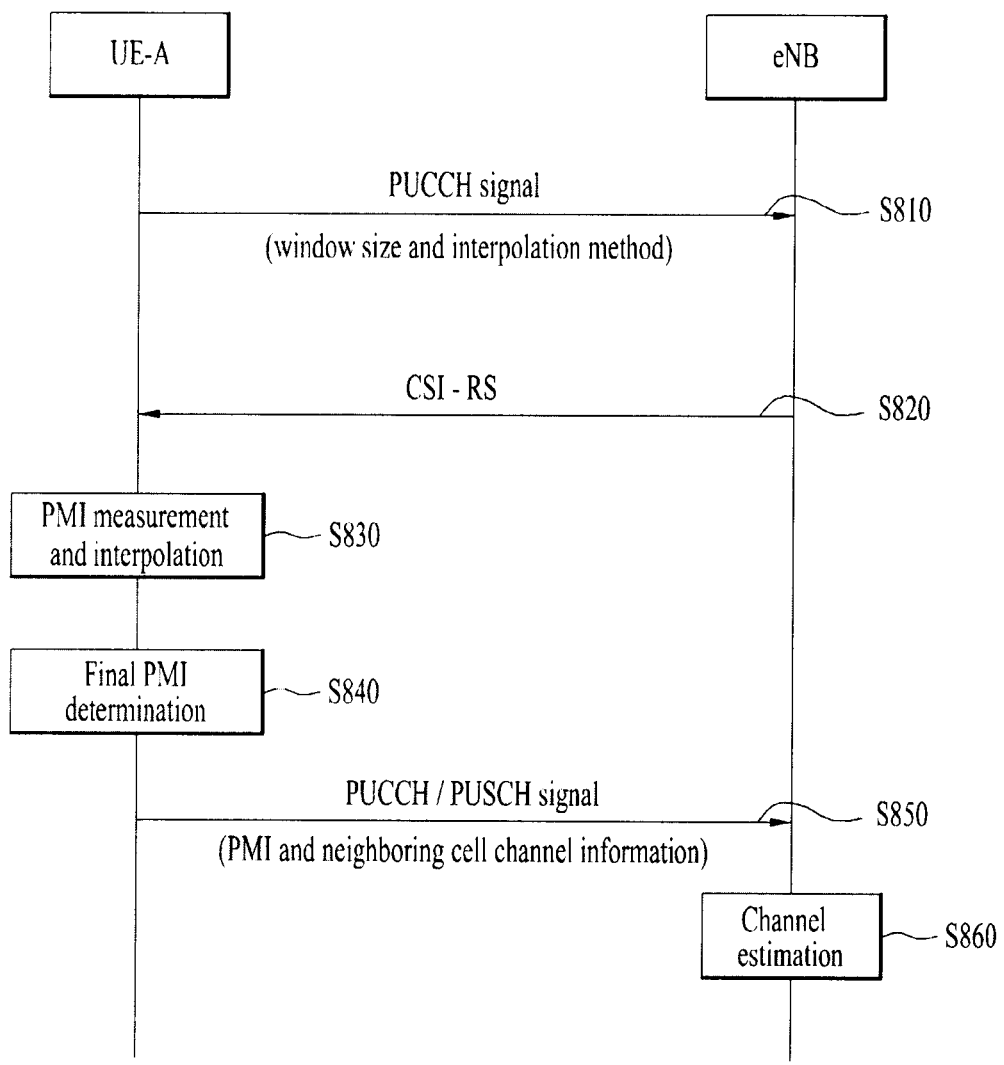
FIG. 8 is a view illustrating another method for determining a PMI through interpolation and feeding back the determined PMI according to an embodiment of the present invention.

FIG. 8 is a view illustrating another method for determining a PMI through interpolation and feeding back the determined PMI according to an embodiment of the present invention.

In FIG. 8, a UE may perform PMI interpolation using a Channel State Information/Indication-Reference Signal (CSI-RS). The CSI-RS indicates an RS newly designed in the LTE-A system and is used for downlink channel measurement.

Referring to FIG. 8, the UE may determine an interpolation method and/or a window size for PMI interpolation and transmit the determined window size and/or interpolation method to an eNB through a PUCCH signal or a PUSCH signal (S810).

Although it is assumed that the UE determines the window size and/or the interpolation method in step S810, the eNB may determine the window size and the interpolation method and transmit the determined window size and interpolation method to the UE through RRC signaling or the PUCCH signal.

The eNB may periodically transmit the CSI-RS for channel measurement to the UE (S820).

The UE may perform PMI measurement and interpolation using the window size and/or interpolation method determined in step S810 (S830).

The UE may determine a final desired PMI based on the PMIs interpolated in step S830 (S840).

The interpolation method performed by the UE in step S830 may use the interpolation method of step S730 of FIG. 7 and the final PMI determination method in step S840 may refer to the method of step S740.

The UE may feed back the determined final PMI and information about a neighboring cell channel to the eNB through the PUCCH signal or a PUSCH signal (S850).

Since the eNB is aware of the window size and interpolation method through the PUCCH signal received in step S810, the eNB can accurately estimate a channel by performing interpolation, which is the same as interpolation performed by the UE, using the received final PMI (S860).

The above PMI interpolation methods described in connection with FIGS. 6 to 8 may be used to accurately transmit precoding matrix information of an optimal signal received by the UE from a serving cell. The PMI interpolation methods may also be used to accurately transmit information about a precoding matrix for an interference signal of a cooperative UE received from the serving cell in consideration of MU-MIMO. For example, the precoding matrix information for the interference signal may include the above-described BCPMI, WCPMI, and/or effective channel feedback.

The PMI interpolation may be used to accurately transmit channel information for a neighboring cell for CoMP. For example, channel information for a neighboring cell may include the BCPMI, WCPMI, and/or effective channel feedback.

Therefore, the UE may transmit BCPMI, WCPMI, and/or effective channel feedback values to the eNB as channel information for the neighboring cell, in addition to the desired PMI in steps S750 and S850 of FIGS. 7 and 8.

(3) PMI Window Size Determination Method

Hereinafter, a method for the UE and/or the eNB to determine the PMI window size for PMI Interpolation in step S710 and S810 will be described.

Figure 9:
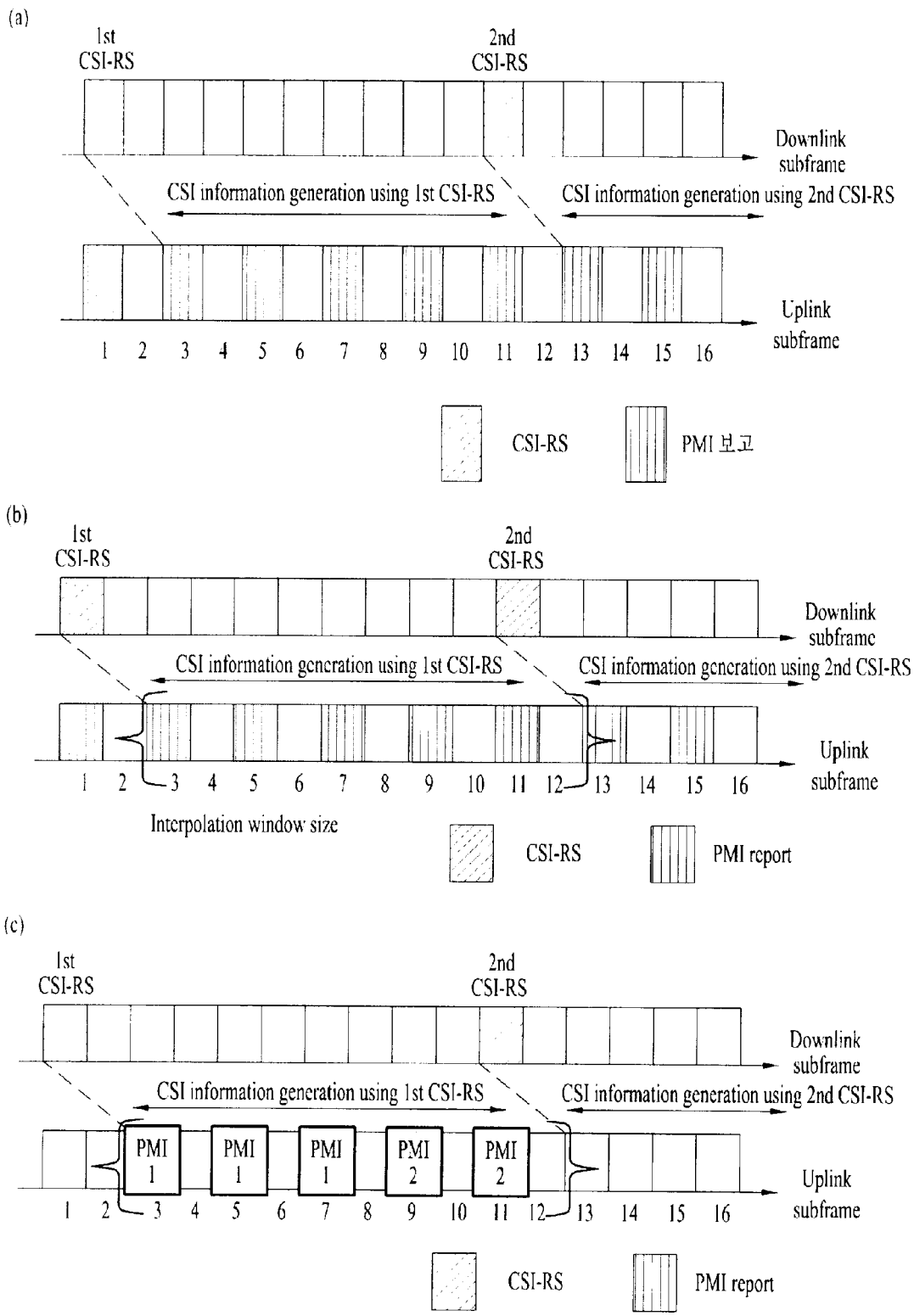
FIG. 9 is a view illustrating a method for determining a PMI window size and a method for performing PMI interpolation using the PMI window, used in embodiments of the present invention.

FIG. 9 is a view illustrating a method for determining a PMI window size and a method for performing PMI interpolation using the PMI window, used in embodiments of the present invention.

In the LTE-A system, a CSI-RS is used for downlink channel measurement. However, as the number of antennas supported in the LTE-A system is increased to 8 (i.e. 8Tx), transmission of an RS to all bands in every subframe as in the legacy LTE system may generate excessive RS overhead. Accordingly, in the LTE-A system, the CSI-RS is transmitted at a relatively long period of a few tens of msec.

If the CSI-RS is transmitted only in a specific subframe at a prescribed period rather than in every subframe, the PMI window size for PMI measurement is desirably determined as a multiple of the number of PMIs which can be fed back through uplink during a CSI-RS transmission period.

FIG. 9(a) illustrates the case in which the window size corresponding to the number of PMIs is 5 in a CSI-RS transmission period. Referring to FIG. 9(a), the CSI-RS transmission is performed once per 10 subframes (i.e. 10 msec) and the UE may transmit 5 PMIs through uplink during 10 msec. In this case, the window size is set to 5 which is the number of PMI reports.

The UE measures the first CSI-RS in the first downlink subframe, determines a PMI in the second subframe, and feeds back the PMI in the third uplink subframe to the eNB. Next, the UE feeds back PMIs calculated based on the first CSI-RS to the eNB in the 5th, 7th, 9th, and 11th uplink subframes.

The UE receives the second CSI-RS in the 11th downlink subframe and generates and feeds back PMI information for a newly measured channel based on the second CSI-RS. That is, the UE feeds back the PMI determined based on the second CSI-RS to the eNB in subframes starting from the 13th uplink subframe.

Referring to FIG. 9(b), when the window size is 5, the UE may calculate PMIs while filling the window in the 3rd, 5th, 7th, 9th, and 11th uplink subframes and calculate PMIs by newly setting the window based on the second CSI-RS in the 13th or more uplink subframes. The newly set interpolation window is comprised of PMIs of the 13th, 15th, 17th, 19th, and 21st subframes.

In the embodiments of the present invention, it is desirable that the window size be a multiple of the number of feedback PMIs during a CSI-RS period (e.g. 10 msec). That is, in FIG. 9, the window size is preferably 5, 10, or 15, which is a multiple of the number of feedback PMIs during a CSI-RS transmission period, i.e. a multiple of 5.

However, if the window size is fully filled as 10 or more, how a new interpolation window is set is problematic. For example, if the window size is 10, the UE calculates PMIs in the same window until the third CSI-RS is received and, after the third CSI-RS is received, the UE should set a new interpolation window to calculate PMIs.

If the interpolation window is fully filled, a new interpolation window may be set using the following two schemes: i) a window reset scheme for eliminating all PMIs of a previous window and reporting PMIs of a new window, and ii) a sliding window scheme for eliminating a part of PMIs of a previous window and considering the remaining PMIs of the previous window in a new window.

i) Window Reset Scheme

If the window size is 10, the UE calculates PMIs in the same window until the third CSI-RS is received. After receiving the third CSI-RS, the UE sets a new interpolation window to calculate PMIs.

In the new window, all PMIs calculated before the third CSI-RS is received are disregarded (eliminated) and the new window is configured as PMIs starting from PMIs calculated using the third CSI-RS before the fifth CSI-RS is received.

That is, the window reset scheme serves to initialize a window when an interpolation window size is fully filled and consider PMIs generated based on a newly received CSI-RS as first interpolated PMIs, without using previously calculated PMIs at all.

ii) Sliding Window Scheme

If the window size is 10, the UE calculates PMIs in the same window until the third CSI-RS is received. After the third CSI-RS is received, the UE sets a new interpolation window to calculate PMIs. At this time, previous PMIs calculated before the second CSI-RS is received are eliminated and the new window is configured as PMIs starting from PMIs calculated using the second CSI-RS before the fourth CSI-RS is received.

Namely, in the sliding window scheme, parts of previous windows are initialized when the window size is fully filled and the new window is configured as the remaining PMIs of the previous window and newly received PMIs during the third CSI-RS. Therefore, upon configuring the window size using the sliding window scheme, the UE may perform PMI interpolation using PMIs of a part of previous windows and PMIs to be measured during a newly received CSI-RS period.

As described above, in the case where the window size of generated PMIs is set to twice or more the number of PMIs fed back during a CSI-RS transmission period, the scheme (reset scheme) for newly interpolating PMIs by initializing the window when the window size is fully filled and the scheme (sliding scheme) for emptying a part of previous PMIs when the window is fully filled and interpolating the remaining PMIs and newly calculated PMIs may be considered.

If the window size of the generated PMIs is set to twice or more the number of feedback PMIs during the CSI-RS transmission period, a channel is varied slowly and this case may be more effective in the case in which channels measured using a plurality of contiguous CRI-RSs are similar.

As the interpolation window configuration method, the reset scheme and the sliding scheme have been proposed. While the schemes have been described based on the case in which the interpolation window size is set to twice or more the number of feedback PMIs during a CSI-RS transmission period, the same rule may be identically applied to the case in which the interpolation window size is set to the same as the number of feedback PMIs during the CSI-RS transmission period (e.g. N=5).

In this way, if the window size is fully filled, the UE may reset the window or set a new window through sliding to carry out interpolation. The UE may perform interpolation under the assumption of both the window reset scheme and the sliding scheme and feed back a PMI having a small error as a result of comparison with a recently measured channel to the eNB. In this case, upon determining the interpolation window size, the UE informs the eNB of the window size determination method by adding 1-bit control information (e.g. a window set indicator) to a PUCCH signal or a PUCCH signal including a desired PMI. For example, the 1-bit control information set to '0' may indicate the window reset scheme and the 1-bit control information set to '1' may indicate the sliding scheme.

(4) Interpolation Window Size Determination Method 2

The above-described embodiments of the present invention are methods for the UE to transmit PMIs over multiple subframes in the time domain and to interpolate the PMIs, thereby raising accuracy of channel feedback. That is, an interpolated window size is set on a time basis.

However, if control channels are sufficient, the UE may transmit a part or all of PMIs interpolated in the interpolation window in one subframe. In this case, the interpolated window may be determined as the number of PMIs transmitted in one subframe.

In addition, upon interpolating PMIs in the interpolation window, the UE may perform interpolation by multiplying phase coefficients by the PMIs. The UE may feed back the phase coefficients together with the interpolated final PMI to the eNB.

In FIG. 9(c) for example, it is assumed that the UE transmits three PMIs 1 (PMI1) and two PMIs 2 (PMI2) and feeds back a phase coefficient $\alpha$ for PMI2. The UE may more accurately feed back a channel state to the eNB by performing interpolation using 3*PMI1+$\alpha$*2*PMI2. If there are N PMIs which are not repeated within the interpolation window, the UE may perform interpolation in the same manner by feeding back phase coefficient values of (N−1) PMIs.

Additionally, the eNB and the UE may perform interpolation by calculating a phase average of respective PMIs rather than simply calculating an average of the sum of the PMIs. For example, if there are three PMIs 1 (PMI1) and two PMIs 2 (PMI2) in the interpolation window as shown in FIG. 9(c), the phase average may be obtained by the following Equation 15.

$$\text{ph\_avg}(PMI1, PMI2, PMI2, PMI2) = \begin{bmatrix} 1 \\ e^{j\frac{\theta_1+3\vartheta_1}{4}} \\ e^{j\frac{\theta_2+3\vartheta_2}{4}} \\ e^{j\frac{\theta_3+3\vartheta_3}{4}} \end{bmatrix},$$ [Equation 15]

$$\text{where } PMI1 = \begin{bmatrix} 1 \\ e^{j\theta_1} \\ e^{j\theta_2} \\ e^{j\theta_3} \end{bmatrix} \text{ and } PMI2 = \begin{bmatrix} 1 \\ e^{j\vartheta_1} \\ e^{j\vartheta_2} \\ e^{j\vartheta_3} \end{bmatrix}$$

If interpolation is performed by the phase average as indicated by Equation 15, an interpolation result value maintains a Constant Modulus (CM) property of PMIs (i.e. respective elements of a matrix are set to the same size). The UE normalizes the interpolation result using the nor( ) function of Equation 13, selects a PMI through comparison of the correlation between channels or the Euclidean distance, and feeds back the selected PMI to the eNB.

Figure 10:
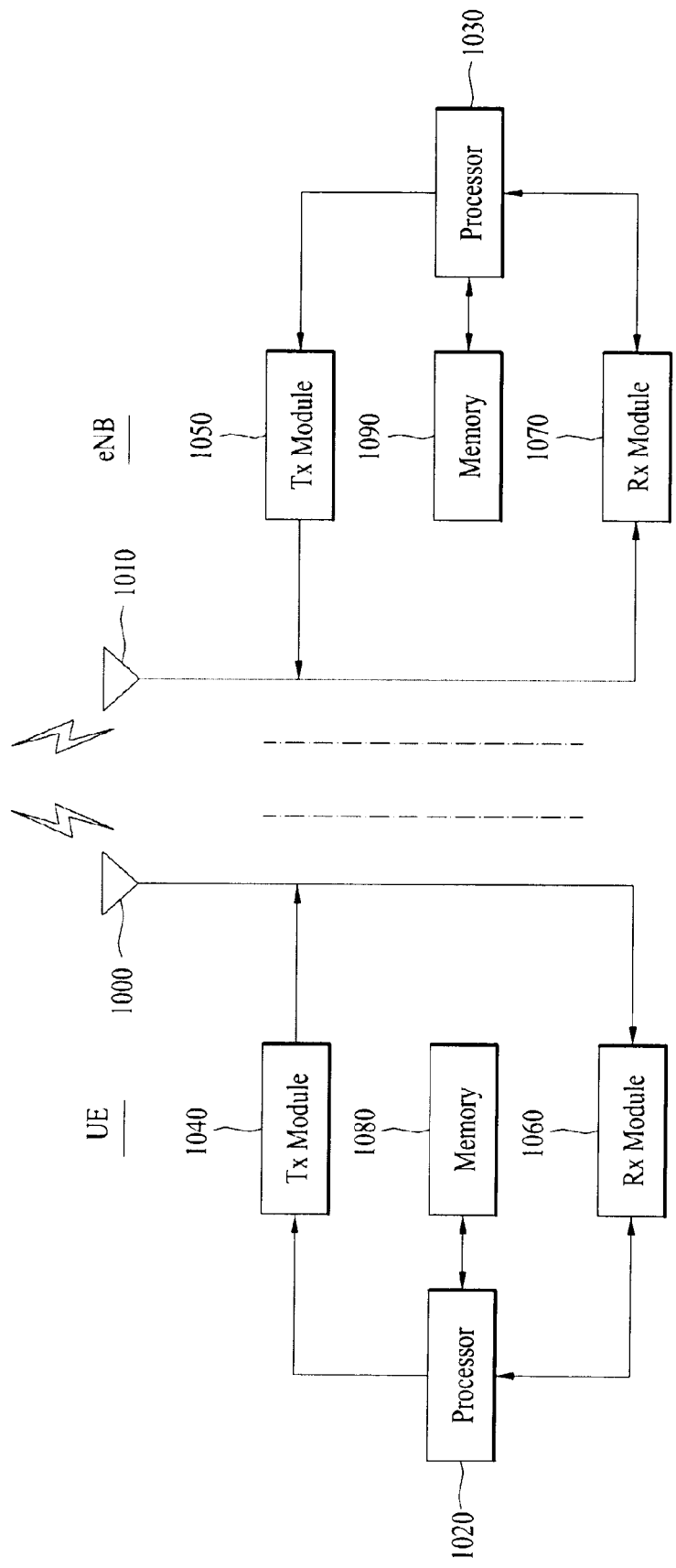
FIG. 10 is a view illustrating a UE and an eNB in which the embodiments of the present invention described with reference to FIGS. 1 to 9 can be implemented, according to another embodiment of the present invention.

FIG. 10 is a view illustrating a UE and an eNB in which the embodiments of the present invention described with reference to FIGS. 1 to 9 can be implemented, according to another embodiment of the present invention.

The UE may operate as a transmitter in uplink and as a receiver in downlink. The eNB may operate as a receiver in uplink and as a transmitter in downlink.

The UE and eNB may include Transmission (Tx) modules 1040 and 1050 and Reception (Rx) modules 1060 and 1070, respectively, for controlling transmission and reception of information, data, and/or messages, and may include antennas 1000 and 1010, respectively, for transmitting and receiving the information, data, and/or messages.

The UE and eNB may include processors 1020 and 1030 for performing the above-described embodiments of the present invention and memories 1080 and 1090 for temporarily or permanently storing a processing procedure performed by the processors, respectively. The UE and eNB of FIG. 10 may further include one or more of an LTE module and a low-power Radio Frequency (RF)/Intermediate Frequency (IF) module to support the LTE system and the LTE-A system.

The Tx modules and Rx modules included in the UE and the eNB may perform a packet modulation/demodulation function for data transmission, a quick packet channel coding function, Orthogonal Frequency Division Multiple Access (OFDMA) packet scheduling, Time Division Duplex (TDD) packet scheduling, and/or a channel multiplexing function.

The apparatus described in FIG. 10 is a means for implementing the methods described with reference to FIGS. 1 to 9. The embodiments of the present invention may be implemented using constituent elements and functions of the aforementioned UE and eNB.

For example, the processor of the UE may measure a desired PMI by performing PMI interpolation in an interpolation window and feed back the desired PMI to the eNB. The eNB may determine an interpolation window size for PMI interpolation to inform the UE of the size and the processor of the UE may determine a channel state. The processor of the UE may interpolate PMIs using the interpolation methods described with reference to FIGS. 6 to 9.

Meanwhile, the UE in the present invention may be any of a Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, a handheld PC, a notebook PC, a smartphone, a Multi Mode-Multi Band (MM-MB) terminal, etc.

The smartphone is a terminal providing the advantages of both a mobile communication terminal and a PDA and may refer to a terminal in which data communication functions such as scheduling management, fax transmission and reception, and Internet access, which are functions of the PDA, are incorporated into the mobile communication terminal. The MM-MB terminal refers to a terminal which has a multi-modem chip therein and which can operate in any of a mobile Internet system and other mobile communication systems (e.g., a CDMA 2000 system, a WCDMA, etc.).

The embodiments of the present invention may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. For example, software code may be stored in the memory units 1280 and 1290 and executed by the processors 1220 and 1230. The memory units are located at the interior or exterior of the processor and may transmit data to and receive data from the processor via various known means.

The embodiments of the present invention may be carried out in other specific ways without departing from the spirit and essential characteristics of the present invention. Accordingly, the above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention may be applied to various wireless access systems, for example, a 3GPP LTE system, a 3GPP LTE-A system, a 3GPP2 system, and/or an IEEE 802.xx system. The embodiments of the present invention may be applied not only to the above various wireless access systems but also to all technical fields employing the various wireless access systems.

The invention claimed is:

1. A method for feeding back a Precoding Matrix Indicator (PMI) at a User Equipment (UE) in a Coordinated Multi-Point (CoMP) environment, the method comprising:

calculating a first interpolated PMI by interpolating PMIs included in a first PMI window, and calculating a second interpolated PMI by interpolating PMIs included in a second PMI window, wherein the PMIs included in the first PMI window and the second PMI window include a PMI in a current subframe and PMIs which have previously been fed back to a base station (BS) and wherein a size of the first PMI window and a size of the second PMI window are proportional to a number of feedback PMIs during a transmission period of a Channel State Information-Reference Signal (CSI-RS);

selecting a desired PMI by comparing the first interpolated PMI and the second interpolated PMI with a channel state of a current channel; and feeding back the desired PMI and a window set indicator for indicating a PMI window used for the desired PMI among the first PMI window and the second PMI window to the BS, wherein, when the first PMI window is full, all of the PMIs included in the first PMI window are eliminated and a new first PMI window is reset starting from a current subframe, and wherein, when the second PMI window is full, a new second PMI window reuses a part of the PMIs included in the second PMI window.

2. The method according to claim 1, wherein the first interpolated PMI is obtained by calculating a first average value of the PMIs included in the first PMI window and the second interpolated PMI is obtained by calculating a second average value of the PMIs included in the second PMI window.

3. The method according to claim 2, wherein the first and second average values are calculated in consideration of phase coefficients of each of the PMIs included in the first PMI window and the second PMI window, respectively.

4. The method according to claim 2, wherein the first average value is a phase average of the PMIs included in the first PMI window and the second average value is a phase average of the PMIs included in the second PMI window.

5. A User Equipment (UE) for feeding back a Precoding Matrix Indicator (PMI) in a Coordinated Multi-Point (CoMP) environment, the UE comprising:
 a transmission module for transmitting radio signals;
 a reception module for receiving radio signals; and
 a processor for feeding back the PMI, wherein the processor calculates a first interpolated PMI by interpolating PMIs included in a first PMI window and calculates a second interpolated PMI by interpolating PMIs included in a second PMI window, selects a desired PMI by comparing the first interpolated PMI and the second interpolated PMI with a channel state of a current channel, and feeds back the desired PMI and a window set indicator for indicating a PMI window used for the desired PMI among the first PMI window and the second PMI window to a Base Station (BS) through the transmission module,
 wherein the PMIs included in the first PMI window and the second PMI window include a PMI in a current subframe and PMIs which have previously been fed back to the BS,
 wherein a size of the first PMI window and a size of the second PMI window are proportional to a number of feedback PMIs during a transmission period of a Channel State Information-Reference Signal (CSI-RS),
 wherein, when the first PMI window is full, all of the PMIs included in the first PMI window are eliminated and a new first PMI window is reset starting from a current subframe, and
 wherein, when the second PMI window is full, a new second PMI window reuses a part of the PMIs included in the second PMI window.

6. The UE according to claim 5, wherein the first interpolated PMI is obtained by calculating a first average value of the PMIs included in the first PMI window and the second interpolated PMI is obtained by calculating a second average value of the PMIs included in the second PMI window.

7. The UE according to claim 6, wherein the first and the second average values are calculated in consideration of phase coefficients of each of the PMIs included in the first PMI window and the second PMI window respectively.

8. The UE according to claim 7, wherein the first average value is a phase average of the PMIs included in the first PMI window and the second average value is a phase average of the PMIs included in the second PMI window.

* * * * *